UNITED STATES PATENT OFFICE.

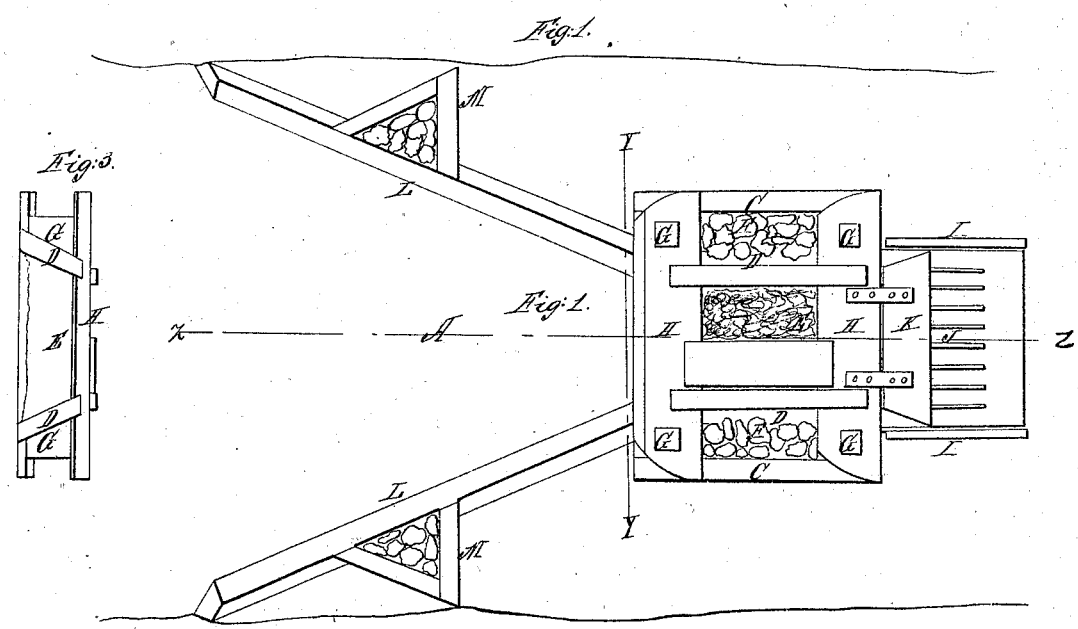

DANIEL BOWMAN, OF TAMPICO, TENNESSEE.

IMPROVEMENT IN FISH-TRAPS.

Specification forming part of Letters Patent No. 23,154, dated March 8, 1859.

*To all whom it may concern:*

Be it known that I, DANIEL BOWMAN, of Tampico, in the county of Granger and State of Tennessee, have invented certain new and useful Improvements in Fish-Traps; and I do hereby declare that the same are described and represented in the following specification and drawings.

To enable others skilled in the art to make and use my improvements, I will proceed to describe their construction and the mode of using the same, referring to the drawings, in which the same letters indicate like parts in each of the figures.

Figure 1 is a plan or top view of a trap with my improvements. Fig. 2 is a section on the line Z Z of Fig. 1.

The nature of my improvements in fish-traps consists in making the dams which guide the fish into the trap to incline toward each other and shelve over, so as to make a dark recess, to induce the fish to run toward the chute and trap when the water is clear as well as when it is muddy; also, in making a cover to the chute, so as to shade the water and make it dark, so that the fish will be induced to enter the chute and trap.

In the accompanying drawings of my invention, A is the bed of the river, which should be leveled by digging or filling in, or part of each, so as to form a level foundation a little below the surface of the bottom of the river to lay the sills B B on, which sills are fastened together by the side sills, C, and by the inclined sides D D of the pen-stock or chute E, the spaces F F between the sills and sides being filled with stones to hold the whole superstructure down and keep it in its place. There are two posts, G G, fastened into each of the sills B B, to the top of which posts the top bars, H H, are fastened firmly, so as not to be lifted off by any rise in river.

The sides of the posts G G which are opposite to each other across the river should incline inward or toward each other, as shown in Fig. 3, so as to make sides D D, which are fastened to the sills and posts, incline toward each other as they rise from the bottom to the top.

The inclined sides D D should be built as high or higher than the top of the bars H H, and the space between them covered with plank or some other material that will obstruct the light and make it dark in the chute, so as to induce the fish to enter.

The sides D D may be made to extend some distance beyond the posts down the river, as shown in the drawings, so as to form parts of the sides I I of the trap J, which trap consists of a series of narrow bars with spaces between them large enough to let the water pass and so small that the fish are retained, as the bars are placed in an inclined position, with their lower ends against or under the sill B, while their upper ends should be as high as the under side of the top bar, H, and supported by stones placed under them for that purpose; and the sides I I may be made as high as may be necessary to prevent the fish from escaping over them.

The side of the sill B may be beveled under, so as to make a dark recess for the fish in the trap, to induce them to stay contentedly until they are taken out by the trapper.

In order to make a large portion of the trap dark, I make a door, K, and hang it to the top bar, H, with hinges, so that it will be lifted by the water when it rises and let the water escape freely, and fall again when the water lowers, and thus act without any attention from the trapper.

It is found that the fish frequent the dark portions of the water, where it is shaded by the bank of the river or by rocks and trees on its banks. I therefore make two dams, L L, diverging in each direction from the chute, as shown in the drawings, and they may be extended to the sides of the river. These dams are made of logs piled one upon another and made to incline inward toward each other and up stream, so as to shelve over and make a dark recess, to induce the fish to run toward and enter the chute and trap when the water is clear, the same as they would do if the water were muddy. The lower ends of these logs may be fastened to the chute, and triangular supports, like M M, may be built up behind them and filled with stones to hold them firmly against the action of the water in the river.

The whole apparatus should be so secured by stone that it will not be floated away by the water when it rises in the river.

As the fish descend the river they are guided in the shady recesses of the dams into the chute and trap, where they remain until removed by the trapper or fisherman with a spear or scoop-net.

I believe I have described and represented my improvements in fish-traps so as to enable any person skilled in the art to make and use them. I will now state what I desire to secure by Letters Patent, to wit:

I claim—

1. Making the dams to incline toward each other and up stream, so as to shelve over and make a dark recess, to induce the fish to run toward the chute and trap when the water is clear as well as when it is muddy.

2. The cover of the chute for the purpose of shading the water and making it dark, so that the fish will be induced to enter the chute and trap.

DANIEL BOWMAN.

Witnesses:
SAMEUL SMITH,
JOHN BOILS.